(12) United States Patent
Uchimura et al.

(10) Patent No.: US 12,354,075 B2
(45) Date of Patent: Jul. 8, 2025

(54) TERMINAL DEVICE, PURCHASE MANAGEMENT METHOD, AND PROGRAM

(71) Applicant: NEC Corporation, Tokyo (JP)

(72) Inventors: Jun Uchimura, Tokyo (JP); Yasuyo Kazo, Tokyo (JP); Shinji Funai, Tokyo (JP); Hiroki Sugegaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 17/911,210

(22) PCT Filed: Mar. 17, 2021

(86) PCT No.: PCT/JP2021/010763
§ 371 (c)(1),
(2) Date: Sep. 13, 2022

(87) PCT Pub. No.: WO2021/193276
PCT Pub. Date: Sep. 30, 2021

(65) Prior Publication Data
US 2023/0098475 A1    Mar. 30, 2023

(30) Foreign Application Priority Data
Mar. 27, 2020   (JP) .................................. 2020-058225

(51) Int. Cl.
*G06Q 20/20* (2012.01)
*G06Q 30/0283* (2023.01)
*G07G 1/12* (2006.01)

(52) U.S. Cl.
CPC ......... *G06Q 20/208* (2013.01); *G06Q 20/202* (2013.01); *G06Q 30/0283* (2013.01); *G07G 1/12* (2013.01)

(58) Field of Classification Search
CPC ............... G06Q 20/208; G06Q 20/202; G06Q 30/0283; G06Q 30/06; G07G 1/12; G07G 1/0036; G07G 1/00
(Continued)

(56) References Cited

U.S. PATENT DOCUMENTS 11,516,195 B2 * 11/2022 Kawahara ............... H04L 9/083
2011/0295704 A1 * 12/2011 Edwards ................ G06Q 30/06
705/16

(Continued)

FOREIGN PATENT DOCUMENTS

JP    2005-173842 A    6/2005
JP    2010-176230 A    8/2010
(Continued)

OTHER PUBLICATIONS

International Search Report for PCT Application No. PCT/JP2021/010763, mailed on Jun. 1, 2021.
(Continued)

*Primary Examiner* — Garcia Ade
(74) *Attorney, Agent, or Firm* — Sughrue Mion, PLLC

(57) ABSTRACT

In a purchase management system using a self-checkout register, pieces of information, which are respectively registered by individual terminal devices, are shared among a plurality of customers. A terminal device capable of acquiring item identification information of each item to be purchased first acquires a cooperation ID. Next, the terminal device shares the information in real time with a cooperative terminal device that is another terminal device and includes the same cooperation ID.

13 Claims, 15 Drawing Sheets

(58) Field of Classification Search
USPC .......................................................... 705/21
See application file for complete search history.

(56) References Cited

U.S. PATENT DOCUMENTS

| | | | | |
|---|---|---|---|---|
| 2012/0033571 | A1* | 2/2012 | Shimezawa | H04J 11/0053 370/252 |
| 2013/0103519 | A1* | 4/2013 | Kountotsis | G06Q 20/28 705/23 |
| 2021/0049575 | A1* | 2/2021 | Widmaier | G06Q 20/208 |
| 2021/0090050 | A1* | 3/2021 | Kaneko | G06Q 20/3276 |
| 2022/0138714 | A1* | 5/2022 | Kaneko | G06Q 20/208 705/21 |

FOREIGN PATENT DOCUMENTS

| | | | |
|---|---|---|---|
| JP | 2014-215772 | A | 11/2014 |
| JP | 2019-057086 | A | 4/2019 |
| KR | 102584227 | * | 9/2023 |
| WO | 2018/100937 | A1 | 6/2018 |

OTHER PUBLICATIONS

JP Official Communication for JP Application No. 2022-510002, mailed on Jan. 7, 2025 with English Translation.

* cited by examiner

FIG. 10

<ITEM SELECTION SCREEN>

ITEM LIST
| TOTAL AMOUNT (INCLUDING TAX) | 961円 |
|---|---|
| MILK ×1 | 198円 |
| COLA ×1 | 98円 |
| CARROT ×1 | 198円 |
| POTATO ×1 | 98円 |
| ONION ×1 | 298円 |
| SUBTOTAL | 890円 |

COOPERATIVE ITEM LIST
| TOTAL AMOUNT (INCLUDING TAX) | 704円 |
|---|---|
| CARROT ×1 | 198円 |
| ICE CREAM ×1 | 98円 |
| CURRY ROUX ×1 | 198円 |
| SOUP BASE ×2 | 158円 |
| SUBTOTAL | 652円 |

FRESH FISH | MEAT
FRUITS AND VEGETABLES | LIQUOR
DAILY NECESSITIES | OTHERS
SNACK | FROZEN FOOD | DAIRY PRODUCT
BREAD | SIDE DISH

RECEIVED MESSAGE: OK! I return it!
MESSAGE INPUT: No ice cream!

MESSAGE | TOTAL | CANCEL

FIG. 14

<TOTALING CONFIRMATION SCREEN>

OK to total with items of the cooperative cart?

※ An item cannot be added after the items have been totaled together.

68 — YES

<ITEMS TO BE PURCHASED SCREEN>

63

TOTAL AMOUNT (INCLUDING TAX)    4820円

61

| MILK | ×1 | 198円 |
| COLA | ×1 | 98円 |
| CARROT | ×1 | 198円 |
| POTATO | ×1 | 98円 |
| ONION | ×1 | 198円 |
| ⋮ | | |

SUBTOTAL    4465円

62

65    66

PAYMENT    CANCEL

FIG. 17

<PAYMENT METHOD SELECTION SCREEN>

TOTAL AMOUNT (INCLUDING TAX)　　4465円　　92

| MILK | ×1 | 198円 |
| COLA | ×1 | 98円 |
| CARROT | ×1 | 198円 |
| POTATO | ×1 | 98円 |
| ⋮ | | |

91

TOTAL　15 items

PAYMENT AMOUNT　¥4,820

93

Please select a payment method.

94　CREDIT　　　95　CASH

TERMINAL DEVICE, PURCHASE MANAGEMENT METHOD, AND PROGRAM

This application is a National Stage Entry of PCT/JP2021/010763 filed on Mar. 17, 2021, which claims priority from Japanese Patent Application 2020-058225 filed on Mar. 27, 2020, the contents of all of which are incorporated herein by reference, in their entirety.

TECHNICAL FIELD

The present disclosure relates to a technical field of a product sales system using a self-checkout register.

BACKGROUND ART

In recent years, an introduction of a self-checkout register has progressed in supermarkets, convenience stores, and the like. For example, there is also a system in which customers scan a bar code of each item by a high-performance shopping cart or a shopping basket, and only a payment is carried out by the self-checkout register. Patent Document 1 describes that the shopping basket scans item information using a barcode reader or the like, and transmits the item information to a sales system while accommodating each item picked up by the customer in the store.

PRECEDING TECHNICAL REFERENCES

Patent Document

Patent Document 1: Japanese Laid-open Patent Publication No. WO2018/100937

SUMMARY

Problem to be Solved by the Invention

In stores such as convenience stores and supermarkets, in a case of shopping with a parent, a child, or a friend, not one shopping basket but a plurality of shopping baskets may be used. Specifically, in a case where the parent and the child respectively put items into separate shopping baskets and each goes to a cash register, the parent pays for the items in the shopping basket used by the parent, and the child pays for the items in the shopping basket used by the child. In other words, each of the parent and the child pays for the items, but the parent normally pays for the items for the child, so there is a need to provide money to the child in advance. The shopping basket described in Patent Document 1 is not assumed in a case where the customer visits a store with a few persons and each of them use a separate shopping basket.

It is a main object of the present disclosure to share information concerning items registered separately by individual terminal devices or the like among a plurality of customers in a purchase management system using a self-checkout register.

Means for Solving the Problem

According to an example aspect of the present disclosure, there is provided a terminal device capable of acquiring item identification information of each item to be purchased, the terminal device including:
a cooperation ID acquisition unit configured to acquire a cooperation ID; and
a sharing unit configured to share information concerning the terminal device and a cooperative terminal device that is a different terminal device from the terminal device and includes the same cooperation ID.

According to another example aspect of the present disclosure, there is provided a purchase management method performed by a terminal device capable of acquiring item identification information of each item to be purchased, the purchase management method including:
acquiring a cooperation ID; and
sharing information concerning a terminal device and a cooperative terminal device that is a different terminal device from the terminal device and includes the same cooperation ID.

According to a further example aspect of the present disclosure, there is provided a program causing a computer to perform a process including:
acquiring item identification information of each item to be purchased;
acquiring a cooperation ID; and
sharing information concerning a terminal device and a cooperative terminal device that is a different terminal device from the terminal device and includes the same cooperation ID.

Effect of the Invention

According to the present disclosure, it is possible to share information concerning items registered separately by individual terminal devices or the like among a plurality of customers in a purchase management system using a self-checkout register.

BRIEF DESCRIPTION OF THE DRAWINGS

FIG. 10 is a display example of the item selection process.

FIG. 14 is a display example of a totaling confirmation screen.

FIG. 15 is a display example of a purchase item screen.

FIG. 17 is a display example of a payment method selection screen.

EXAMPLE EMBODIMENTS

In the following, example embodiments will be described with reference to the accompanying drawings.

[Configuration of the Purchase Management System]

Figure 1:
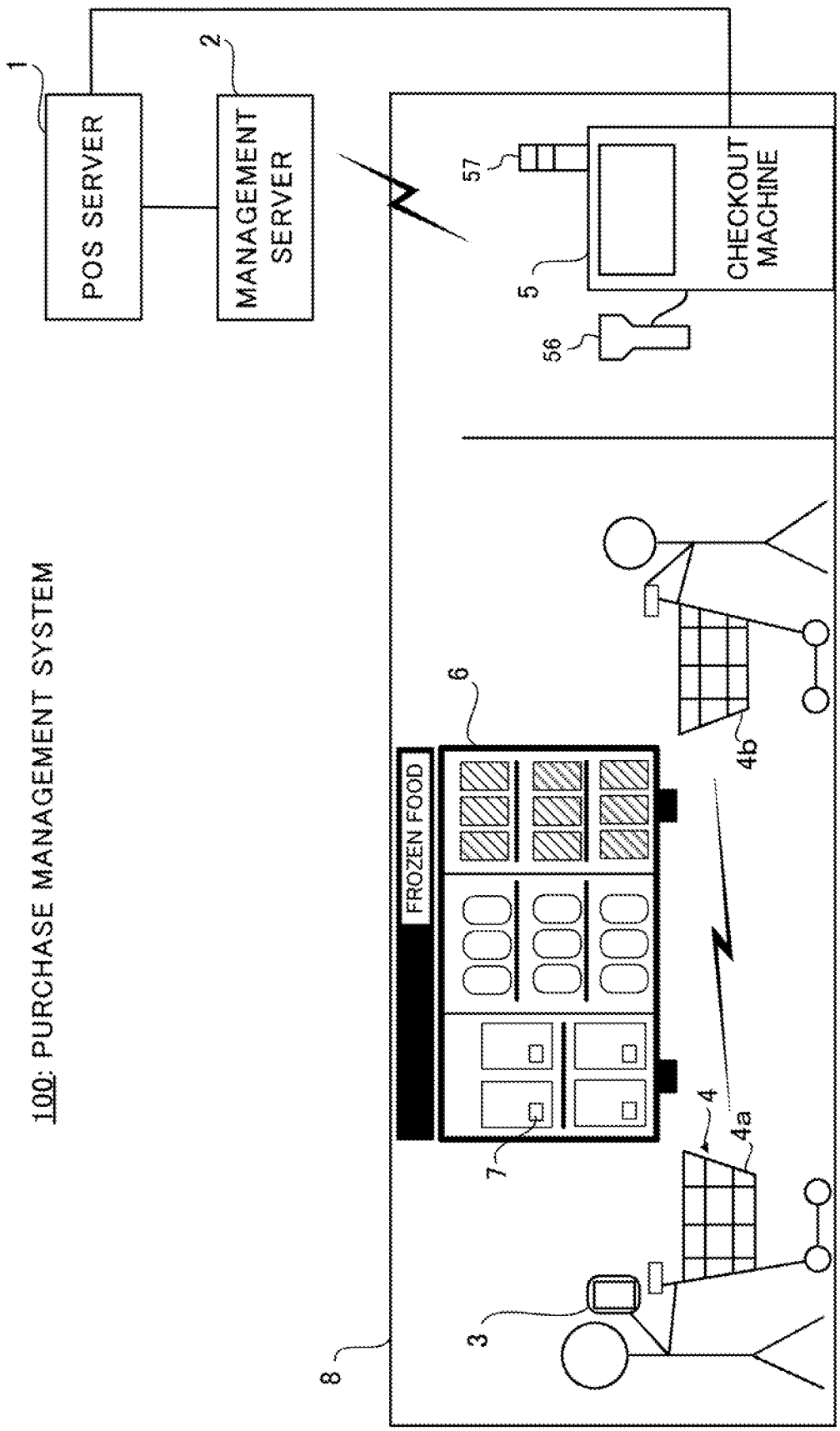
FIG. 1 illustrates a configuration of a purchase management system according to an example embodiment.

FIG. 1 illustrates a configuration of a purchase management system 100 according to the present example embodiment. The purchase management system 100 mainly includes a POS server 1, a management server 2, a mobile terminal 3, a high-performance cart (hereinafter, also referred to as a "cart") 4, and a checkout machine 5. In the purchase management system 100, a customer registers items expected to be purchased (also referred to as "items to be purchased") by scanning an item barcode 7, which is attached to each of items displayed on an item shelf 6, by the cart 4 within a store 8 which sells the items. By a credit payment or other means, the registered items to be purchased are paid by using the checkout machine 5 in the store 8. The mobile terminal 3 is a terminal device such as a smartphone or the like used by the customer.

The POS server 1 is a server that manages various types of sales information such as prices, item information including an inventory status, and the like, which are related to items to be sold in the store 8, and earning information of the store 8. The POS server 1 can communicate with the management server 2 and the checkout machine 5 via a network or the like. That is, the POS server 1 may be one that collectively manages sales information of a plurality of affiliated stores, or may be one that is arranged for each of the stores, and manages the sales information alone of that store.

The management server 2 is a server device that controls the mobile terminal 3 and the checkout machine 5, and can communicate with the POS server 1, the mobile terminal 3, the cart 4, and the checkout machine 5 via a network or the like. The management server 2 acquires and stores information necessary for a display control of the mobile terminal 3 from the POS server 1. The management server 2 transmits display information to the mobile terminal 3 in order for the mobile terminal 3 to display various screens. As will be described in detail later, the various screens described above include a cooperation ID screen for a plurality of carts 4 to display a cooperation ID for sharing information in real time. Here, the 'real time' means immediate and that a process is performed at almost the same time with each input. Specifically, the information input by the predetermined cart is transmitted to the plurality of carts having the same cooperation ID substantially at the same time as the input, so that the plurality of carts share the information with each other.

The management server 2 may be formed by a plurality of server devices. For instance, the management server 2 may include a server device that mainly performs an interface operation with the mobile terminal 3 such as a data exchange with the mobile terminal 3, and a server device that stores and manages various types of information acquired from the POS server 1. In this case, the former server device function as a so-called application server, and the latter server device function as a so-called database server. In this case, these server devices exchange information necessary for each to execute allocated processes through a network or the like.

The mobile terminal 3 is a mobile terminal used by a customer shopping at the store 8, and includes a function for acquiring and displaying various screens such as the cooperation ID screen and the like by communicating with the management server 2. Note that in FIG. 1, for convenience of explanations, only one mobile terminal 3 is depicted; however, mobile terminals 3 are actually present for the number of customers using the cooperation ID in the store 8.

In the store 8, the cart 4 is used when the customer who is shopping puts in items to purchase and moves, and includes a display unit 41 such as a display. For instance, in a case where a parent and a child visit the store 8 together, one cart 4a in a cart storage area of the store 8 is a cart used by the parent and another one cart 4b is a cart used by the child. The cart 4 includes a function for scanning the item barcode 7 attached to each item, a function for generating a list of items to be purchased, which are registered by scanning the item barcode 7 (also referred to as an "item list"), a function for displaying various screens such as an item selection screen including the item list, a function for sharing information in real time among a plurality of carts 4, and other functions.

Note that, in the present example embodiment, the item barcode 7 is scanned as a method for the cart 4 to identify each item to be purchased; however, the present disclosure is not limited to this method and various methods can be applied. For instance, the cart 4 may include an image recognition function, and each of items put in the cart 4 may be identified by an image recognition.

The checkout machine 5 is a payment machine (so-called self-checkout machine) for the customer to make a payment using the cart 4. The checkout machine 5 is capable of communicating with the management server 2, the mobile terminal 3, and the cart 4, and transmits and receives various pieces of information necessary for a payment to the management server 2, the mobile terminal 3, the cart 4, and the POS server 1 as necessary.

[Configurations of Servers and Others]

Next, each configuration of the POS server 1, the management server 2, the mobile terminal 3, the cart 4, and the checkout machine 5 will be described with reference to FIG. 2 to FIG. 6.

(POS Server)

Figure 2:
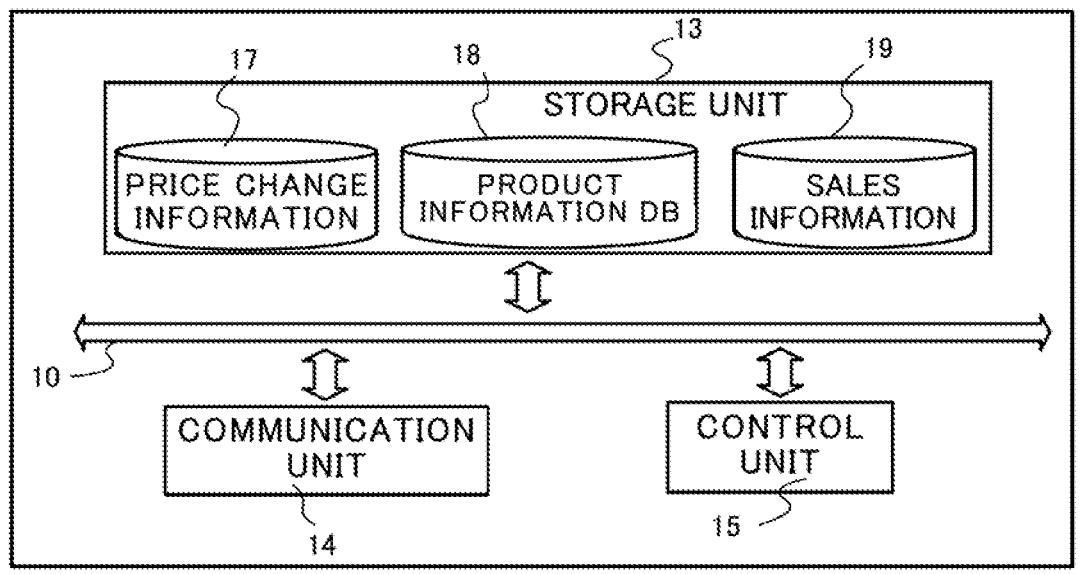
FIG. 2 illustrates a schematic configuration of a POS server.

FIG. 2 illustrates a schematic configuration of the POS server 1. The POS server 1 mainly includes a storage unit 13, a communication unit 14 for performing data communications, and a control unit 15. These elements are mutually connected via a bus line 10.

The storage unit 13 is configured by a memory such as a hard disk or a flash memory. The storage unit 13 stores programs to be executed by the control unit 15, and information necessary for the control unit 15 to perform a predetermined process by executing a program. In the present example embodiment, the storage unit 13 includes price change information 17, a product information DB (Database) 18, and sales information 19 which is information related to sales of a product. Note that the storage unit 13 may store the price change information 17, the product information DB 18, various types of information related to sales other than the sales information 19.

The product information DB 18 is a database of information on items handled by the store 8 or the affiliated stores including the store 8. The product information DB 18 includes, for instance, various information such as information (also referred to as "item identification information") for identifying a product such as a product price and a JAN (Japanese Article Number) code, classification information of a product, an inventory status of the product, and the like.

The price change information 17 is information related to a price change. Specifically, the price change information 17 includes at least one of arbitrary discount information and reduction information such as classification specific sales reduction information, bundle reduction information, set reduction information, total reduction information, and classification specific price reduction information.

The control unit 15 includes a CPU (Central Processing Unit), a ROM (Read Only Memory), and a RAM (Random Access Memory) which are not illustrated, and the like, and performs various controls with respect to each of components in the POS server 1. For instance, the control unit 15 performs update or the like of the sales information 19 by communicating with the checkout machine 5 via the communication unit 14. Moreover, the control unit 15 transmits information related to the price change information 17 and the product information DB 18 to the management server 2 by communicating with the management server 2 via the communication unit 14.

(Management Server)

Figure 3:
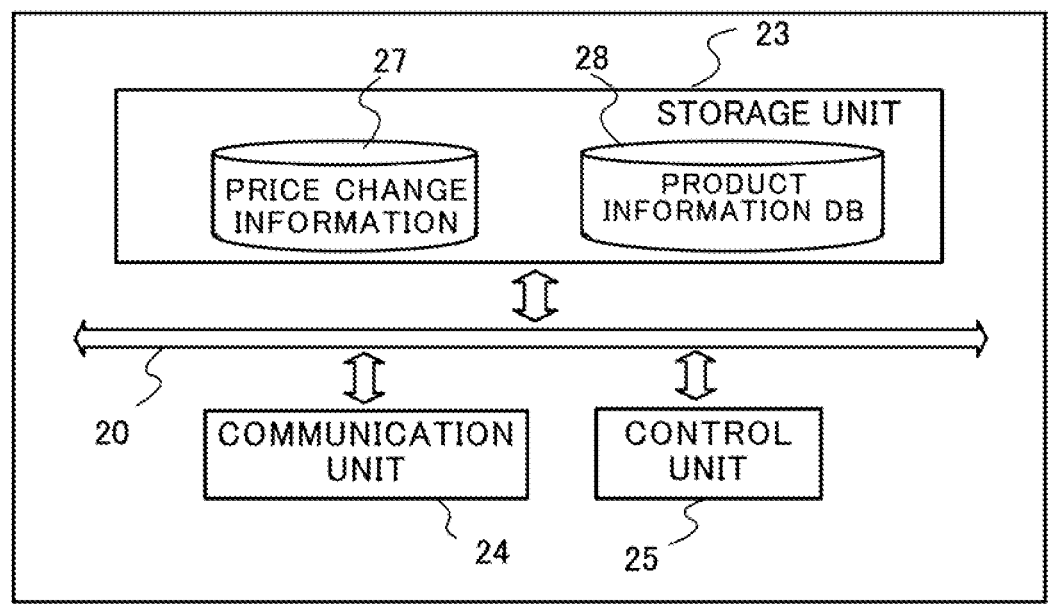
FIG. 3 illustrates a schematic configuration of a management server.

FIG. 3 illustrates a schematic configuration of the management server 2. The management server 2 mainly includes a storage unit 23, a communication unit 24, and a control unit 25. Each of these elements is connected to each other via a bus line 20.

The storage unit 23 is formed by a memory such as a hard disk or a flash memory. The storage unit 23 stores a program to be executed by the control unit 25, and information necessary for the control unit 25 to execute a predetermined process by executing a program. In the present example embodiment, the storage unit 23 stores price change information 27 and a product information DB 28.

The price change information 27 is information related to a change of the price due to a reduction or a discount, similar to the price change information 17. The price change information 27 is periodically or irregularly updated based on a control of the control unit 25 so as to synchronize with the price change information 17 stored in the POS server 1. The product information DB 28 is a database of information concerning each product, similar to the product information DB 18. The product information DB 28 is periodically or irregularly updated so as to synchronize with the product information DB 18 stored in the POS server 1 based on a control of the control unit 25.

The communication unit 24 communicates with the POS server 1, the mobile terminal 3, the cart 4, and the checkout machine 5 through a wired or wireless communication. The control unit 25 includes a CPU, a ROM, and a RAM which are not illustrated, and performs various controls with respect to each of the components in the management server 2. A process executed by the control unit 25 will be described later.

(Mobile Terminal)

Figure 4:
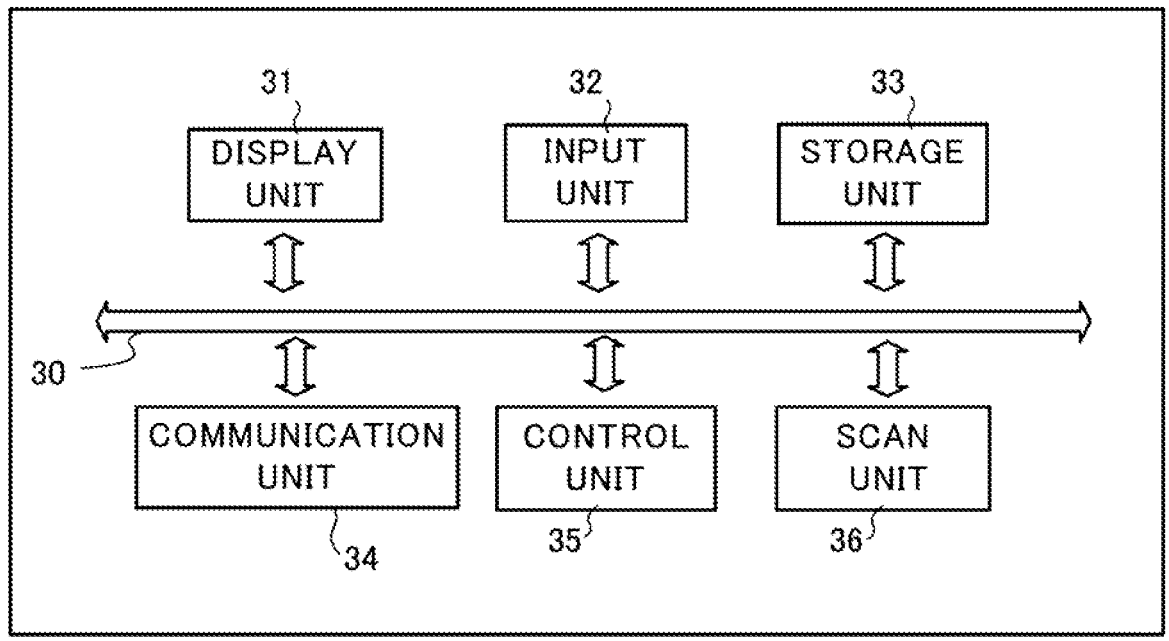
FIG. 4 illustrates a schematic configuration of a terminal device.

FIG. 4 illustrates a schematic configuration of the mobile terminal 3. The mobile terminal 3 mainly includes a display unit 31, an input unit 32, a storage unit 33, a communication unit 34, a control unit 35, and a scan unit 36. Each of these elements is connected to each other via a bus line 30.

The display unit 31 displays various types of information such as the cooperation ID based on a control of the control unit 35. The input unit 32 is an interface that receives an input of a user, and corresponds to, for instance, a touch panel, buttons, a voice input device, or the like.

The storage unit 33 is configured by a memory such as a hard disk or a flash memory. The storage unit 33 stores a program to be executed by the control unit 35, and information necessary for the control unit 35 to execute a predetermined process by executing a program. For instance, the storage unit 33 stores a dedicated application program that is started when shopping is carried out at the store 8 and controls displaying of various screens such as the cooperation ID screen and the like.

The communication unit 34 communicates with the management server 2 through a wireless communication. The control unit 35 includes a CPU, a ROM and a RAM, and the like which are not illustrated, and performs various controls for each of the components in the mobile terminal 3. A control executed by control unit 35 will be described later.

The scan unit 36 is, for instance, an optical device such as a camera, and supplies scanned information to the control unit 35.

(Cart)

Figure 5:
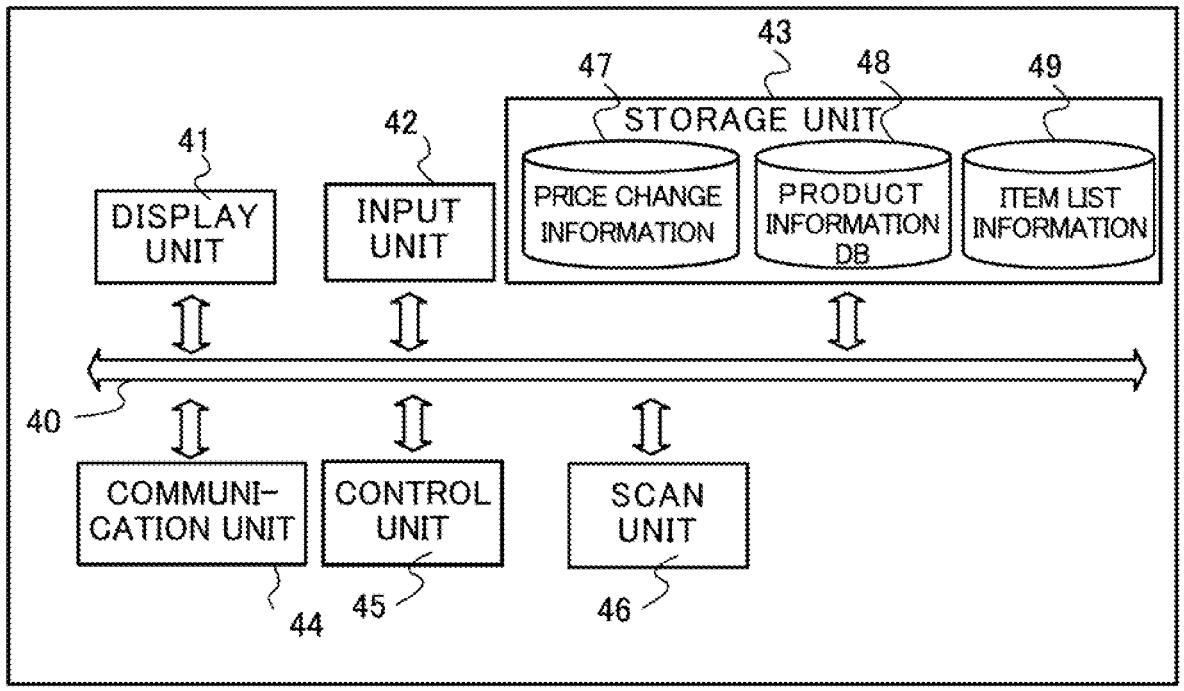
FIG. 5 illustrates a schematic configuration of a cart.

FIG. 5 illustrates a schematic configuration of the cart 4. The cart 4 mainly includes the display unit 41, an input unit 42, a storage unit 43, a communication unit 44, a control unit 45, and a scan unit 46. Each of these elements is connected to each other via a bus line 40.

The display unit 41 displays various information such as an item selection screen and a totaling confirmation screen based on a control of the control unit 45. The input unit 42 is an interface that receives an input of a user, and corresponds to, for instance, a touch panel, buttons, a voice input device, or the like.

The storage unit 43 is configured by a memory such as a hard disk or a flash memory. The storage unit 43 stores programs executed by the control unit 45, and stores information necessary for carrying out a predetermined process when the control unit 45 executes a program. For instance, the storage unit 43 stores a dedicated application program that is activated based on the cooperation ID to be described later when a plurality of the carts 4 in the store 8 share information, and performs an item selection process or a totaling process. In the present example embodiment, the storage unit 43 stores price change information 47, a product information DB 48, and item list information 49.

The price change information 47 is information concerning a change of the price due to a reduction or a discount, similar to the price change information 17. The price change information 47 is periodically or irregularly updated based on a control of the control unit 45 so as to synchronize with the price change information 17 stored in the POS server 1. The product information DB 48 is a database of information concerning items as well as the product information DB 18. The product information DB 48 is periodically or irregularly updated to synchronize with the product information DB 18 stored in the POS server 1 based on the control of the control unit 45.

The item list information 49 is information concerning the item list in which the items to be purchased are registered using the cart 4. The item list is, for instance, a list including item identification information indicating the items to be purchased and an expected quantity of the items to be purchased. The item list information 49 stores an item list registered by the cart 4 itself and another item lists (also referred to as a "cooperative item list") in which a registration is carried out on a cart (hereinafter, referred to as a "cooperative cart") that is cooperating with another cart by having the same cooperation ID, although the details will be described later. The item list stored in the item list information 49 is updated every time an addition, a deletion, or a quantity change of the items to be purchased is carried out based on an operation of the cart 4.

The communication unit 44 communicates with the POS server 1, the management server 2, the mobile terminal 3, another cart 4, and the checkout machine 5 through the wireless communication. In particular, within the store 8, the communication unit 44 communicates with another cart 4 associated with based on the cooperation ID to be described later, in order to share information in real time by the wireless communication such as Wi-Fi (registered trademark) or Bluetooth (registered trademark). The control unit 45 includes a CPU, a ROM and a RAM, or the like which are not illustrated, and performs various controls for each of the components in the cart 4. The process executed by the control unit 25 will be described later. In the above configuration, the communication unit 24 corresponds to an example of a sharing unit of the present disclosure, and the control unit 25 corresponds to an example of a cooperation ID acquisition unit and an aggregation unit of the present disclosure.

The scan unit 46 is, for instance, an optical device such as a camera, scans the item barcode 7 attached to each item, and supplies the scanned information to the control unit 45. In the present example embodiment, the control unit 45 acquires item identification information such as a JAN code from the item barcode 7 attached to each item based on the scanned information output by the scan unit 46.

Note that when the customer enters the store 8, the cart 4 is initialized and placed in the cart storage place in a state in which the battery is charged. Here, the initialization corresponds to a state in which the cooperation ID used by a previous customer and the item list related to items to be purchased of the previous customer are erased from the storage unit 43. In the present example embodiment, a high-performance cart such as the cart 4 is applied; however, instead of the cart 4, a shopping basket or a container having a function similar to that of the cart 4 may be used.

(Checkout Machine)

Figure 6:
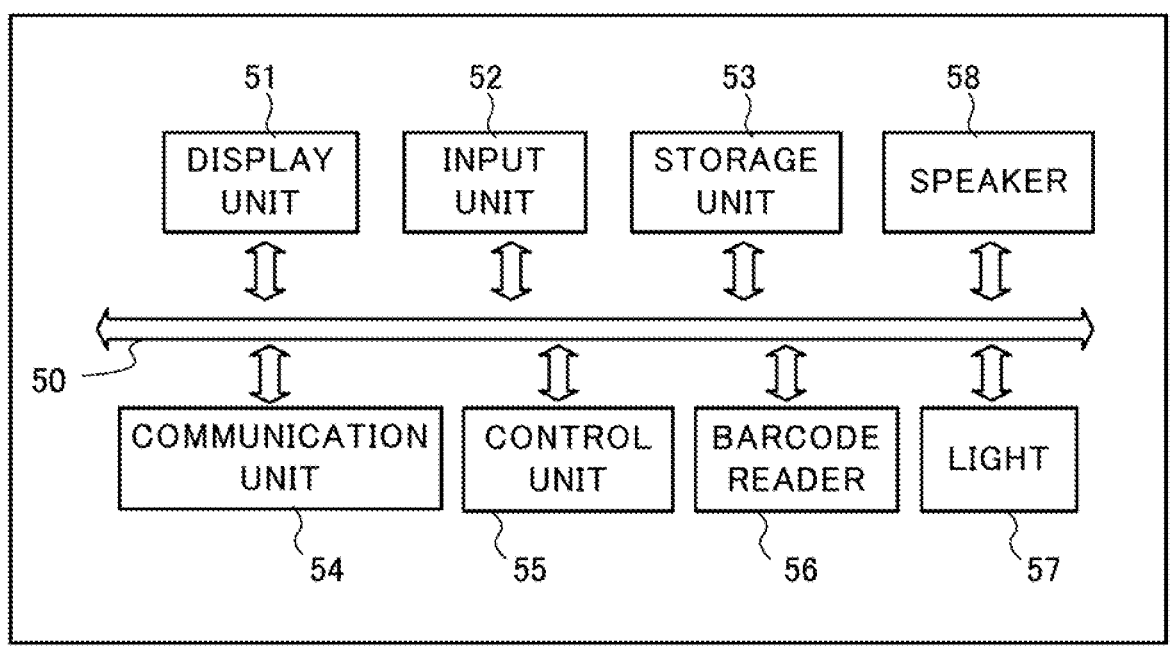
FIG. 6 illustrates a schematic configuration of a checkout machine.

FIG. 6 illustrates a schematic configuration of the checkout machine 5. The checkout machine 5 mainly includes a display unit 51, an input unit 52, a storage unit 53, a communication unit 54, a control unit 55, a barcode reader 56, a light 57, and a speaker 58. Each of these elements is connected to each other via a bus line 50.

The display unit 51 performs displaying of various types of information such as a payment method selection screen and a checkout end screen based on a control of the control unit 55. The input unit 52 is an interface that receives inputs of a customer, for instance, a touch panel, buttons, or the like.

The storage unit 53 is formed by a memory such as a hard disk or a flash memory. The storage unit 53 stores programs to be executed by the control unit 55, and information necessary for carrying out a predetermined process when the control unit 55 executes a program. For instance, the storage unit 53 stores a dedicated application program that is activated when the customer makes a payment and carries out the checkout process.

The control unit 55 includes a CPU, a ROM and RAM, or the like which are not illustrated, and performs various controls for each component in the checkout machine 5. A control executed by the control unit 55 will be described later. The light 57 is turned on in a case where a problem occurs in the checkout machine 5 or in a case of calling a clerk. The speaker 58 outputs an operation sound or a voice message for an attention as necessary.

[Cooperation ID]

Next, the cooperation ID in the purchase management system 100 will be described.

In the store 8 such as a convenience store and a supermarket, in a case of shopping with a parent or a child, shopping may be carried out with a plurality of the carts 4, instead of one cart 4. Specifically, in a case where a parent and a child respectively put items into separate carts 4 and respectively go to the checkout machines 5, the parent pays for the items contained in one cart 4 used by the parent, and the child pays for the items contained in another cart 4 used by the child. In other words, the parent and the child separately pay for the items, but the parent normally pays for the items for the child, so there is a need to give the child money in advance.

In this example embodiment, based on the cooperation ID for the plurality of the carts 4 to cooperate with each other, information is shared in real time among the carts 4 while each of the carts 4 is used to purchase items in the store 8. Specifically, it is possible for the carts 4 to share information at any timing during an item registration or while searching of an item. Moreover, based on the cooperation ID, pieces of information of the plurality of the carts 4 are collected into one cart 4 which is arbitrarily determined. The cooperation ID corresponds to identification information for specifying the carts 4 that share information, and a two-dimensional barcode, a RFID (Radio Frequency Identifier), a PIN (Personal Identification Number) code, a password, or the like can be optionally applied. For instance, in a case where the customer does not have the mobile terminal 3, the customer may directly input the cooperation ID as a password to the cart 4, or a medium such as the RFID may have information indicating the cooperation ID, and the cart 4 may acquire the cooperation ID from the medium.

Figure 7:
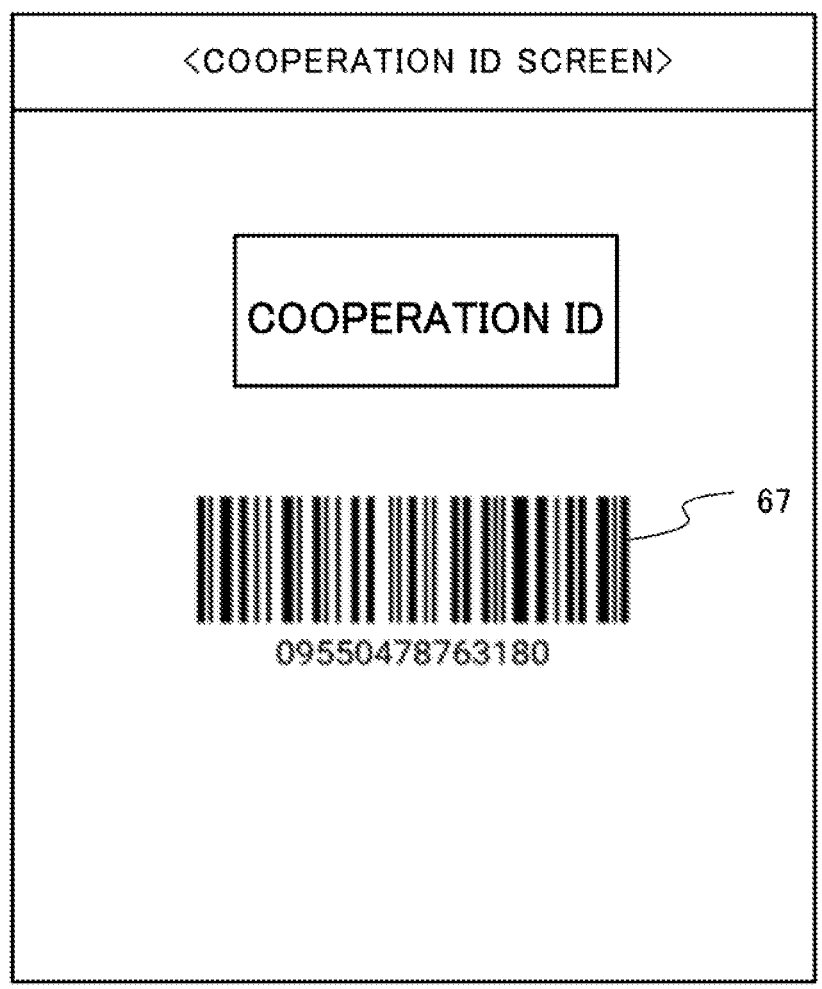
FIG. 7 illustrates a display example of a cooperation ID screen.

For instance, the cooperation ID is issued by the management server 2 through a dedicated application in response to an operation of the customer with respect to the mobile terminal 3. Note that the cooperation ID is not limited to an identification issued by the management server 2, and may be information that specifies the carts 4 sharing the information. When the cooperation ID is issued, the mobile terminal 3 stores the cooperation ID in the storage unit 33 and displays the cooperation ID screen indicating the cooperation ID received from the management server 2 on the display unit 31. FIG. 7 illustrates a display example of the cooperation ID screen displayed on the mobile terminal 3. In this example, the cooperation ID screen includes a code 67 indicating the cooperation ID. The code 67 may be any code such as a barcode or an QR (Quick Response) code (registered trademark) as long as the code is capable of identifying the cooperation ID.

[Cooperative Purchase Process]

Figure 8:
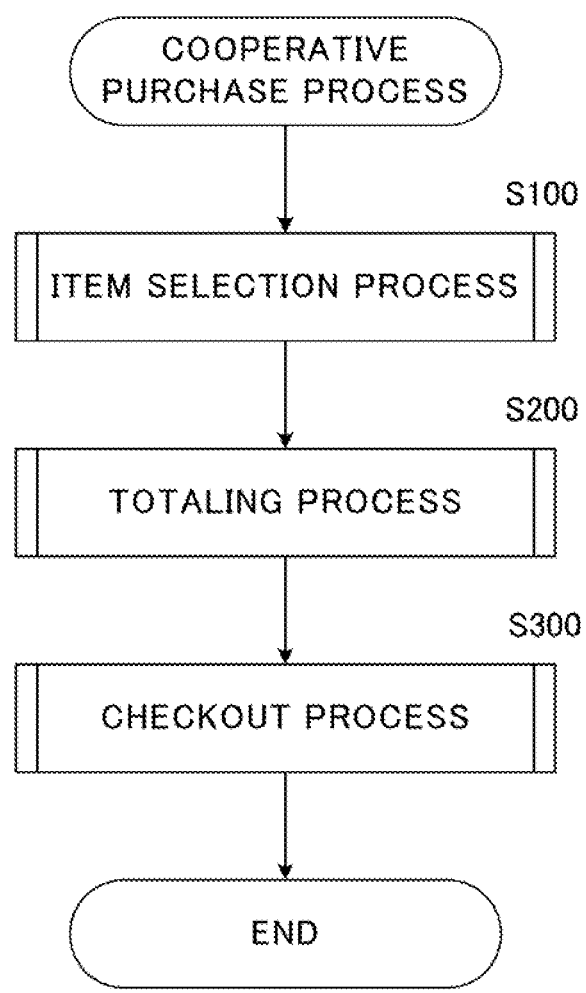
FIG. 8 is a flowchart of a cooperative purchase process.

Next, an outline of a cooperative purchase process by the purchase management system 100 will be described. The cooperative purchase process corresponds to a process for selecting an item while information is shared among a plurality of carts 4 in real time and for purchasing items by collecting pieces of information from the plurality of carts 4 to one cart 4, based on the cooperation ID, in a case where a customer is a group of a plurality of people such as a parent and a child, or friends in the store 8 and a plurality of carts 4 are used. FIG. 8 is a flowchart representing an outline of the cooperative purchase process. The cooperative purchase process roughly includes an item selection process S100, a totaling process S200, and a checkout process S300. Note that the cooperative purchase process is realized mainly by the carts 4 and the checkout machine 5 each of which executes a corresponding program prepared in advance.

(Product Selection Process)

Figure 9:
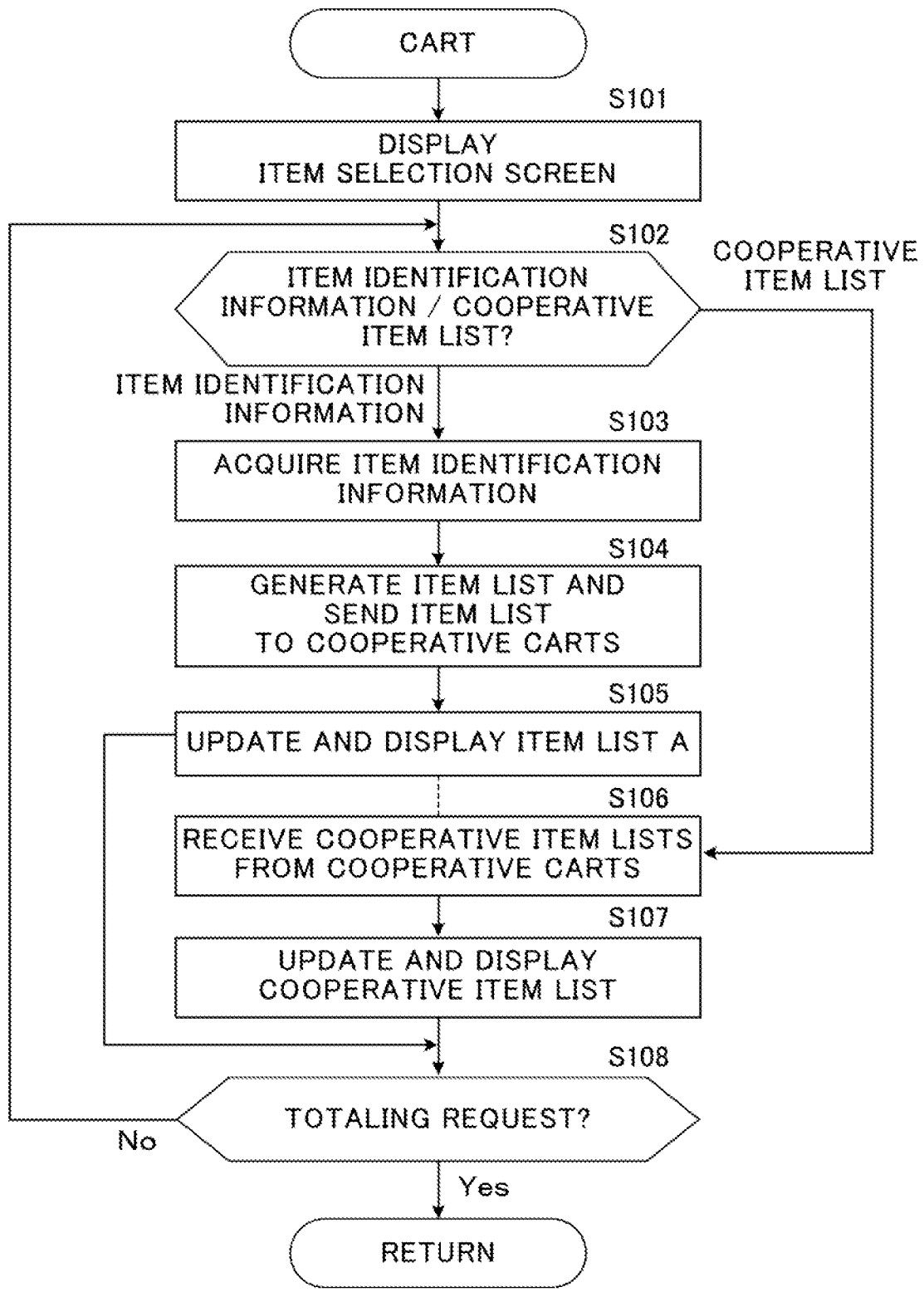
FIG. 9 is a flowchart of an item selection process.

First, the item selection process will be described. The item selection process performs a registration of items to be purchased by scanning the item barcode 7 attached to each of the items by the customer using the cart 4, and is regarded as a process for sharing information in real time with one or more cooperative carts based on the cooperation ID. FIG. 9 is a flowchart of the item selection process. This process is performed by each cart 4.

When the customer visits the store 8, the mobile terminal 3 displays the cooperation ID screen in order to cause each of carts 4, which are to be cooperated, to scan the code 67. By scanning the code 67, the cart 4 acquires the cooperation ID and stores the cooperation ID in the storage unit 43. Accordingly, it is possible for the cart 4 to specify other carts 4 having the same cooperation ID, and to share and collect information via the wireless communication among a plurality of the carts 4 having the same cooperation ID. Specifically, for instance, in a case where a parent and a child visit together, one cart 4a in the cart storage area of the store 8 is used as an in-use cart for the parent, another cart 4b is used as an in-use cart for the child. The customer displays the cooperation ID screen on the mobile terminal 3 and causes respective scan units 46 of the cart 4a and the cart 4b to scan the code 67. Accordingly, the cart 4a used by the parent and the cart 4b used by the child will cooperate with each other based on the cooperation ID.

Here, from a point of view of the cart 4a used by the parent, the cart 4b used by the child having the same cooperation ID becomes a cooperative cart sharing information. On the other hand, from a point of view of the cart 4b used by the child, the cart 4a used by the parent, which is associated with the cooperation ID becomes another cooperative cart sharing the information. In the present example embodiment, the cart 4a used by the parent is used as a reference, and the cart 4b used by the child is used as the cooperative cart. Incidentally, the number of cooperative carts may be one or more.

For settings of the reference cart and the cooperative cart, for instance, a cart having the code 67 scan first may be used as the reference cart, and another cart having the code 67 scan at a second time and later may be used as the cooperative cart. In addition, a message such as "Do you use this cart as the reference cart or the cooperative cart" may be displayed on an initial screen of the cart, and the customer may select which cart is used as the reference cart.

The cart 4 first displays the item selection screen on the display unit 41 (step S101). FIG. 10 is a display example of the item selection screen. In this example, the item list registered by the cart 4, the cooperative item list registered by the cooperative cart, a message button 76, a total button 77, a cancel button 78, a message field 79, and an in-store map 85 are provided. The item list includes a list display field 71, a subtotal display field 72, and a total amount display field 73. Similarly, the cooperative item list includes a list display field 81, a subtotal display field 82, and a total amount display field 83. The message field 79 includes a received message display field 74 and a message input field 75. The in-store map 85 includes an in-use cart icon 86 indicating a location of an in-use cart, and a cooperative cart icon 87 indicating a location of the cooperative cart.

Each of the list display field 71 and the list display field 81 displays a name, a quantity, and a price of the item to be purchased for each item to be purchased. Specifically, the list display field 71 displays the name, the quantity, and the price of each of items to be purchased which are registered in the cart 4a used by the parent. On the other hand, the list display field 81 displays the name, the quantity, and the price of each of items to be purchased which are registered in the cooperative cart 4b used by the child.

Each of the subtotal display field 72 and the subtotal display field 82 indicates a subtotal without tax for prices for all items of the item list and the cooperative product list. In addition, each of the total amount display field 73 and the total amount display field 83 displays a total amount of prices including tax for all items of the item list and the cooperative item list. In detail, each of the subtotal display field 72 and the total amount display field 73 displays a subtotal and a total amount in the item list registered in the cart 4a used by the parent. On the other hand, each of the subtotal display field 82 and the total amount display field 83 displays a subtotal and a total amount in the cooperative item list.

The cart 4 generates a list based on the item identification information obtained by scanning the item barcode 7, and calculates a subtotal or a total amount of the list based on the prices and the price change information 47 of the items to be purchased registered in the item information DB 48. Accordingly, the cart 4 generates an item list registered in the cart itself. The cooperative item list is received by communications from the cooperative cart. The item list and the cooperative item list are stored in the item list information 49 and the item list information 49 is updated. Specifically, the cart 4a used by the parent generates the item list based on the acquired item identification information. In addition, the cart 4a receives the cooperative item list from the cooperative cart 4b used by the child. Information concerning the items to be purchased such as item identification information obtained by each cart is also called item acquisition information.

In this example embodiment, the item list is formed by a list display field, a subtotal display field, and a total amount display field; however, the present disclosure is not limited thereto, and a configuration can be arbitrarily set if the name of each item and the price thereof are known. Moreover, in the present example embodiment, the cooperative item list is received from the cooperative cart; however, the present disclosure is not limited thereto, the item identification information of each item registered by the cooperative cart may be received from the cooperative cart, and the cart 4 may generate or update the cooperative item list based on the received item identification information.

The message button 76 is a button that is pressed to send a message to the cooperative cart. In detail, when the customer enters a message in the message input field 75 and presses the message button 76, the message is transmitted to the cooperative cart. The message transmitted from the cooperative cart is displayed in the received message display field 74 in real time.

For instance, when the cooperative cart 4b registers an item that is not to be purchased by looking at the cooperative item list of the item selection screen, the parent operates the cart 4a, inputs "No ice cream!" in the message input field 75, and presses the message button 76, so as to send the message to the cooperative cart 4b. When the child who sees that message sends a message "OK! I return it!" in the cooperative cart 4b, the parent cart 4a displays this message in the received message display field 74. According to this cooperation, it is possible to exchange messages in real time between the carts 4 cooperating with each other.

In the present example embodiment, there is one cooperative cart; however, in a case of a plurality of cooperative carts, the message field 79 may be formed to select to which of the cooperative carts the message is to be sent. In the present example embodiment, although the message is written by text, the present disclosure is not limited to this manner, and may be by a call such as a videophone or the like.

The total button 77 corresponds to a button that is pressed in a case of making a totaling request to the cooperative cart in order to add items, a subtotal, and a total amount in the item list, with items, a subtotal and a total amount in the cooperative item list. In response to pressing the total button 77, it is possible for the cart 4 to collect pieces of the item acquisition information related to the items to be purchased, subtotals, and total amounts of its own cart and the cooperative cart before a checkout, and to add up quantities of items, the subtotals, the total amounts, and the like. That is, the total button 77 is pressed at the cart 4 that collects pieces of the item acquisition information among the plurality of carts 4 which are associated with each other based on the cooperation ID. Specifically, the cart 4, which has sent the totaling request in response to pressing the total button 77, can collect the item acquisition information to its own cart in a case where an approval is obtained from the cooperative cart that has received the totaling request. According to this cooperation, it is possible for the customer to collect pieces of information of all items to be purchased into one cart 4 as items to be purchased information, so as to smoothly perform the checkout process.

The cancel button 78 is to be pressed to stop shopping and cancel the cooperative purchase process. Specifically, when the customer presses the cancel button 78, the cart 4 transmits a message indicating a cancel of the shopping to each cooperative cart, and erases and initializes the cooperation ID and the information related to the item list and the cooperation list stored in the item list information 49.

The in-store map 85 is a simple sketch of the store 8, in which a current location of the cart 4 used by the customer is displayed by the in-use cart icon 86, and a current location of the cooperative cart is displayed by the cooperative cart icon 87. Location information of the cart 4 can be obtained, for instance, by a wireless communication with the item shelf 6 arranged in the store 8 by the Wi-Fi or the like. The cart 4 constantly transmits its own location information to the cooperative cart and constantly receives the location information of the cooperative cart from the cooperative cart. In other words, the cooperative carts share the location information in real time.

Specifically, in a case where the parent sees the in-store map 85 and finds out that the cooperative cart 4b is near a fruit and vegetable section, the parent can send a message such as "Can you buy an apple?". According to an example of use, it is convenient for the parent because it is possible to register an item at another section away from the cart 4a used by the parent, at the cooperative cart 4b being used by the child.

Returning to FIG. 9, next, the cart 4 determines whether the item identification information is acquired by scanning the item barcode 7 or the cooperative item list is received from the cooperative cart (step S102). When the item identification information is acquired (step S103), the cart 4 generates an item list based on the item identification information and transmits the generated item list to the cooperative cart (step S104). Moreover, the cart 4 stores the generated item list in the product list information 49 in a case of a first time, and updates the product list information 49 based on the product list generated in a case of a second time or later. After that, the cart 4 displays the item list of the item selection screen based on the latest item list, and advances to a process of step S108 (step S105).

On the other hand, when the item list registered by the cooperative cart, that is, the cooperation item list is received, from the cooperative cart (step S106), the cart 4 stores the received cooperative item list in a case of the first time, and updates the item list information 49 based on the received cooperation product list in a case of the second time or later.

Subsequently, the cart 4 displays the cooperative item list of the item selection screen based on the latest cooperative item list (step S107).

After that, the cart 4 determines whether to send and receive the totaling request (step S108). Specifically, when the total button 77 is pressed by the customer, the cart 4 transmits the totaling request to the cooperative cart. Therefore, the cart 4 determines to send and receive the totaling request (step S108; Yes), and advances to the totaling process. Also, when the total button 77 is pressed in the cooperative cart, the cart 4 receives the totaling request from the cooperative cart. Therefore, the cart 4 determines that sending or receiving of the totaling request is performed (step S108; Yes), and advances to the totaling process.

On the other hand, when the item identification information is acquired by scanning the item barcode 7, it is determined that the cart 4 does not send or receive the totaling request (step S108; No), and the cart 4 goes back to a process of step S102. Also, even when the coordinated item list is received from the cooperative cart, the cart 4 determines not to send and receive the totaling request (Step S108; No), and goes back to the process of the step S102.

(Totaling Process)

Figure 11:
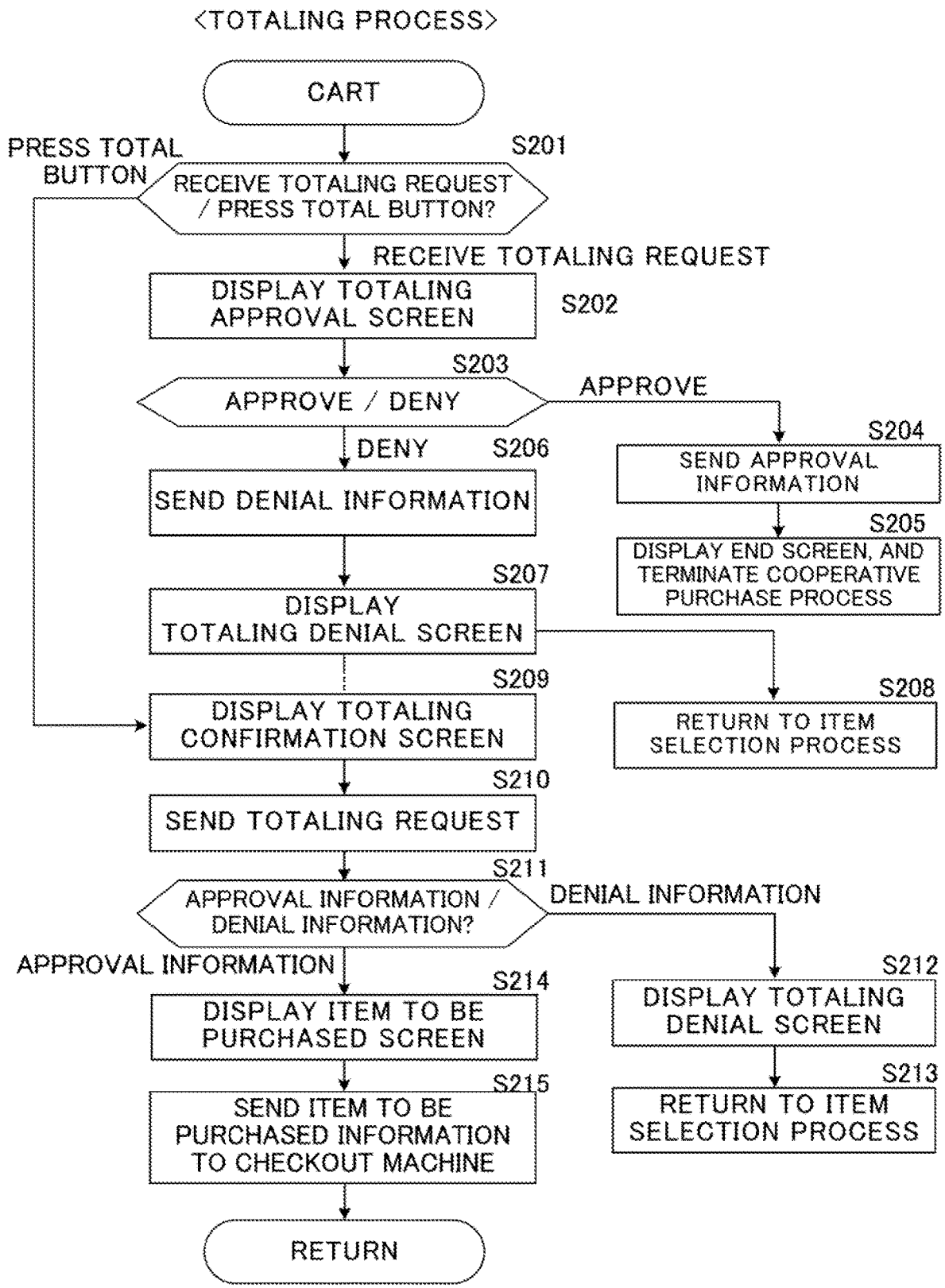
FIG. 11 is a flowchart of a totaling process.

Next, the totaling process will be described. The totaling process is a process that collects pieces of item acquisition information from a plurality of carts 4 cooperating with each other to one cart among the plurality of carts cooperating based on a cooperation ID, and totals quantities of items, subtotals, total amounts, and the like. The totaling process is performed by one cart 4 that collects the pieces of item acquisition information among the plurality of carts 4 cooperating with each other based on the cooperation ID, and sends a totaling request to other cooperative carts. Specifically, the cart 4, which has sent the totaling request by pressing the total button 77, can collect the item acquisition information to its own cart when obtaining an approval of each cooperative cart that has received the totaling request. FIG. 11 is a flowchart of the totaling process. This process is performed by the cart 4.

Figure 12:
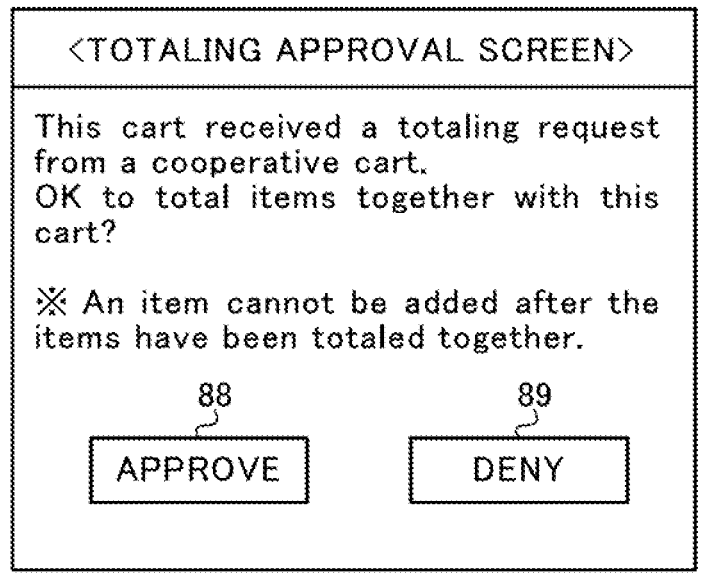
FIG. 12 is a display example of a totaling approval screen.

The cart 4 determines whether the totaling request is received from the cooperative cart or its own cart transmits the totaling request to other cooperative carts in response to a press of the total button 77 (step S201). When the totaling request is received from each cooperative cart, the cart 4 displays a totaling approval screen on the display unit 41 (step S202). FIG. 12 is a display example of the totaling approval screen. In this example, the totaling approval screen includes a message for inquiring whether or not to approve the totaling request from the cooperative cart, a note stating that an item cannot be added after the totaling process, an approve button 88, and a deny button 89. When the approve button 88 is pressed by a customer, the cart 4 transmits approval information to the cooperative cart. On the other hand, when the deny button 89 is pressed by the customer, the cart 4 transmits the denial information to the cooperative cart.

The cart 4 determines which of the approval information and the denial information has been sent to the cooperative cart (step S203). When the approval information is sent to the cooperative cart (step S204), the cart 4 displays an end screen including a message indicating that the shopping is finished by the totaling process with the cooperative cart. Next, the cart 4 initializes by erasing the cooperation ID, and information related to the item list and the cooperative list which are stored in the item list information 49, and terminates the cooperative purchase process (step S205). Accordingly, by this initialization, the cart 4 can no longer additionally register items in the item list.

In the present example embodiment, when the items are totaled with those of the cooperative cart, an item cannot be added; however, the present disclosure is not limited thereto, that is, in a case where the cart 4 is capable of adding and deleting an item, and changing a quantity of items, and the like, these all operations become unavailable after the totaling of the items. The method is not limited to the initialization but it may be any method such as a restriction or the like with respect to the display unit 41 or the scan unit 46.

Moreover, in the present example embodiment, when items are totaled, an item cannot be added in both the in-use cart and the cooperative cart; however, the present disclosure is not limited thereto, and only the cart 4 of which items are totaled in another cart, that is, only the cart 4 that receives the totaling request and transmits the approval information may be formed to be unable to add an item. In other words, the cart 4, which totals the items, may be possible to add an item even after the totaling of the items. In the foregoing example, in a case where the cart 4a used by the parent sends the totaling request to the cart 4b used by the child and the child approves the totaling of the items, the cart 4b used by the child will not be able to add an item, but the cart 4a used by the parent may be able to continue adding items even after the totaling of the items.

Figure 13:
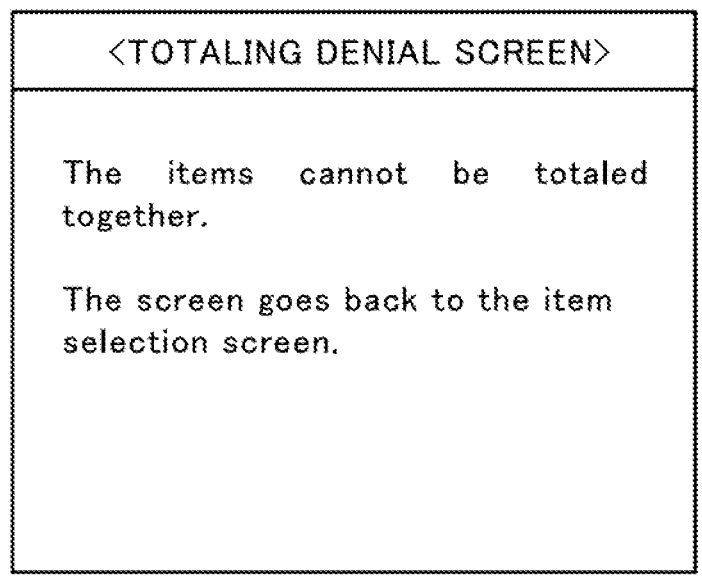
FIG. 13 is a display example of a totaling denial screen.

On the other hand, when the denial information is transmitted to the cooperative cart (step S206), the cart 4 displays a totaling denial screen on the display unit 41 (step S207). FIG. 13 is a display example of the totaling denial screen. In this example, the totaling denial screen includes a message of returning to the item selection screen because the items cannot be totaled. When the totaling denial screen is displayed, the cart 4 returns to the item selection process (step S208) and displays the item selection screen (step S101).

In a process of step S201, when the cart 4 sends the totaling request to the cooperative cart in response to pressing the total button 77 at its own cart, the cart 4 displays the totaling confirmation screen on display unit 41 (step S209). FIG. 14 is a display example of the totaling confirmation screen. In this example, the totaling confirmation screen includes a message for inquiring whether to perform the totaling, a note stating that an item cannot be added after the totaling, a YES button 68, and a NO button 69. When the YES button 68 is pressed by a customer, the cart 4 transmits a totaling request to the cooperative cart. On the other hand, when the NO button 69 is pressed by the customer, the cart 4 returns to the item selection process, and displays the item selection screen.

When the customer presses the YES button 68, the cart 4 sends a totaling request to the cooperative cart (step S210). Next, the cart 4 determines which of the approval information and the rejection information has been received from the cooperative cart (step S211). When the denial information is received from the cooperative cart, the cart 4 displays the totaling denial screen on the display unit 41 (step S212). FIG. 13 is a display example of the totaling denial screen, and explanations thereof will be omitted. Subsequently, the cart 4 returns to the item selection process (step S213), and displays the item selection screen (step S101).

On the other hand, when the approval information is received from the cooperative cart, the cart 4 collects the item list and the cooperative item list generated based on respective pieces of the item acquisition information, and generates the items to be purchased list based on the items to be purchased information regarding all items to be purchased. Next, the cart 4 displays the items to be purchased screen including the items to be purchased list on the display unit 41 (step S214). When the items to be purchased list is generated, the cart 4 is controlled so that and an item cannot be added. FIG. 15 is a display example of the items to be purchased screen. In this example, the items to be purchased screen includes an items to be purchased list display field 61, a subtotal display field 62, a total amount display field 63, a payment button 65, and a cancel button 66.

The items to be purchased list display field 61 displays the items to be purchased list that indicates a name, a quantity, and a price of an item for each item to be purchased. Specifically, in the items to be purchased list display field 61, names, quantities, and prices of all items to be purchased, which are registered in the cart 4a used by the parent and the cart 4b used by the child, are displayed. The subtotal display field 62 displays a subtotal without tax for the prices for all items to be purchased in the item list and the cooperative item list. In addition, the total amount display field 63 displays a total amount including tax in the prices for all items to be purchased in the product list and the cooperative item list.

The payment button 65 is a button to be pressed in order to transmit the items to be purchased information related to the items to be purchased list to the checkout machine 5. In addition, the cancel button 66 is a button to be pressed in order to cancel the cooperative purchase process because the shopping is stopped. Specifically, when the customer presses the cancel button 66, the cart 4 erases and initializes the cooperation ID, and information related to the item list and the cooperative list which are stored in the item list information 49.

When the payment button 65 is pressed in the items to be purchased screen, the cart 4 sends the item list information to the checkout machine 5 (step S215). Specifically, for instance, the customer presses a start button or the like displayed on the display unit 51 in the checkout machine 5 which is installed in the store 8, moves the cart 4 being used closer to the checkout machine 5, and presses the payment button 65 in the items to be purchased screen. Upon pressing the payment button 65, the cart 4 transmits the items to be purchased information to the checkout machine 5.

(Checkout Process)

Figure 16:
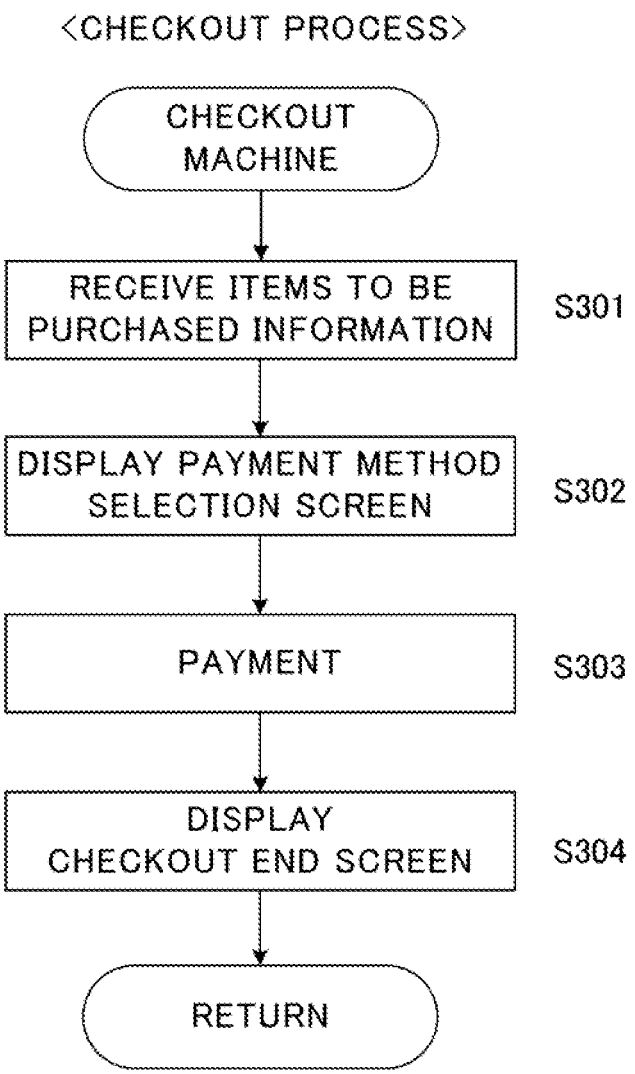
FIG. 16 is a flowchart of a checkout process.

Next, the checkout process will be described. The checkout process is a process for making a payment for items to be purchased which are registered by a customer based on items to be purchased information received from the cart 4 in the totaling process. FIG. 16 is a flowchart of the checkout process. This process is mainly performed by the checkout machine 5.

When receiving the items to be purchased information from the cart 4 (step S301), the checkout machine 5 displays the payment method selection screen on the display unit 51 (step S302). FIG. 17 is a display example of the payment method selection screen. In this example, the payment method selection screen includes an items to be purchased list display field 91, a subtotal display field 92, a total amount display field 93, a credit button 94, and a cash button 95. The items to be purchased list display field 91 displays a name, a quantity, and a price for each of the items to be purchased. The subtotal display field 92 displays a subtotal excluding tax of the prices for all items to be purchased displayed in the items to be purchased list display field 91, and the total amount display field 93 displays the total amount including tax of the prices for all items to be purchased. Note that the payment method selection screen includes the items to be purchased list display field 91 and the subtotal display field 92; however, the present disclosure is not limited thereto, and it is sufficient to be able to carry out a confirmation of the payment amount and a selection of the payment method.

The customer confirms an amount to payment by looking at the payment method selection screen, and presses either one of the credit button 94 and the cash button 95, and makes a payment. In this manner, the payment for purchase is made (step S303). In detail, when the customer selects to a credit payment, the checkout machine 5 prompts the customer to insert a credit card and enter a password or the like as necessary, so as to perform the credit payment. In addition, in a case where the customer chooses to make a payment in cash, the checkout machine 5 prompts the customer to insert the cash into a cash slot, and when the cash is inserted, the change is paid as required. Noted that the payment method is not limited to the credit payment and cash, it is possible to set various methods such as an electronic money and the like.

Figure 18:
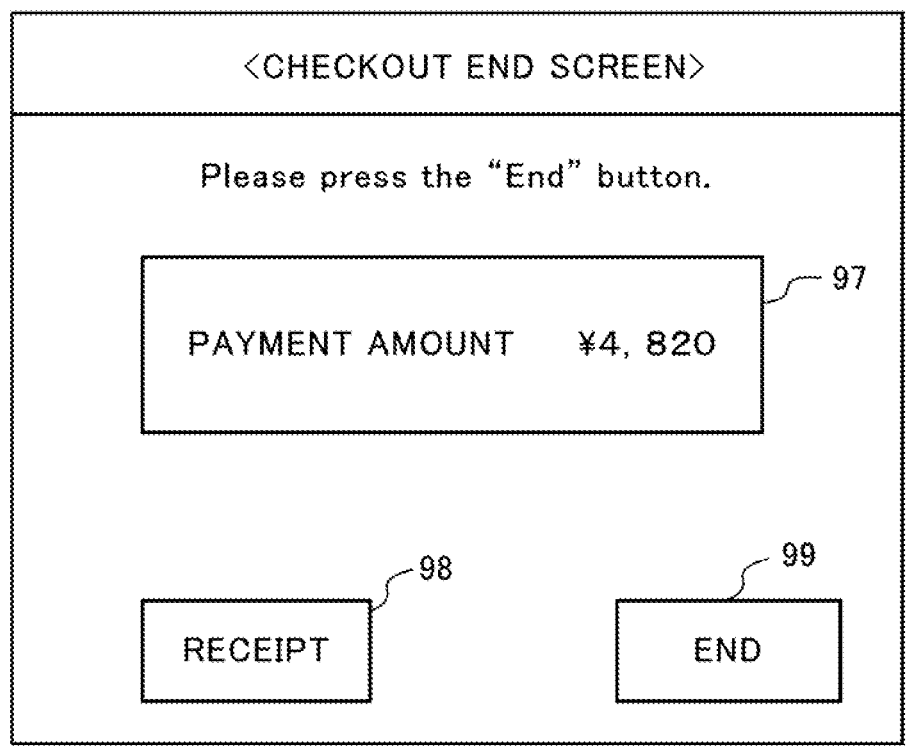
FIG. 18 is a display example of a checkout end screen.

When the payment is completed, the checkout machine 5 displays the checkout end screen (step S304). FIG. 18 illustrates a display example of the checkout end screen. In this example, the checkout end screen includes a payment information field 97, a receipt button 98, and an end button 99. The payment information field 97 displays an amount of a payment. The receipt button 98 is a button for printing out a receipt. The end button 99 is a button for confirming that the customer has completed the checkout process. When the customer presses the end button 99, the checkout machine 5 returns a display of the display unit 51 to a main menu. In the present example embodiment, the payment information field 97 only displays the amount of the payment, but the present disclosure is not limited thereto, and information may be displayed such as a payment method, a card company, or the like.

As described above, according to the cooperative purchase process of the present example embodiment, in a case of purchasing items in the store 8, it is possible for a plurality of carts 4 to share information in real time based on the cooperation ID. Specifically, since the cart 4 can share registered items, these prices, messages, current locations, and the like with the cooperative cart in real time, it is convenient for a case where a parent and a child, friends, or the like use a plurality of carts 4 for shopping. In addition, based on the cooperation ID, it is possible to collect pieces of information of the plurality of carts 4 into one cart 4 arbitrarily determined. In detail, the cart 4 can perform totaling of prices of items with the cooperative cart by a simple operation such as pressing the totaling button 77. Therefore, even in a case where the parent and the child, the friends, or the like shop with the plurality of carts 4, one payment source can be easily used and a waiting time can be shortened.

Modification (Modification 1)

In the above-described example embodiment, as soon as the customer visits the store 8, the customer lets a plurality of carts 4 scan the code 67 and acquire the cooperation ID. However, the present disclosure is not limited thereto, and it is possible to have the cart 4 acquire the cooperation ID at any time before the checkout process is carried out. The cart 4 starts the cooperative purchase process at the time when the cart 4 acquires the cooperation ID.

(Modification 2)

In the above example embodiment, based on the cooperation ID, one arbitrarily determined cart 4 collects pieces of item acquisition information of a plurality of cooperative carts as items to be purchased information; however, rather than the cart 4, the pieces of item acquisition information may be collected to the mobile terminal 3 or the checkout machine 5. In detail, the pieces of item acquisition information may be collected on the mobile terminal 3 which displays the cooperation ID screen, and the mobile terminal 3 may transmit the items to be purchased information to the checkout machine 5. Alternatively, the checkout machine 5 may scan the code 67 on the cooperation ID screen displayed at the mobile terminal 3, the item acquisition information may be collected by the checkout machine 5 which has acquired the cooperation ID, and the checkout machine 5 may thus generate items to be purchased information and perform the checkout process.

(Modification 3)

In the above-described example embodiment, a plurality of carts 4 performing an item registration share information based on the cooperation ID, and a single cart 4 collects pieces of the item acquisition information and generates items to be purchased information by performing the totaling process before a payment. In addition, the checkout machine 5 performs the checkout process based on the items to be purchased information generated by the cart 4. However, the present disclosure is not limited thereto, and in a case where the mobile terminal 3 is capable of acquiring the item identification information by scanning the item barcode 7, the mobile terminal 3 may be used in place of the cart 4. That is, a plurality of mobile terminals 3 for performing the item registration share information based on the cooperation ID, and one mobile terminal 3 may collect pieces of the item acquisition information by performing the totaling process before a payment, so as to generate items to be purchased information. In this case, the mobile terminal 3 may send purchase information to the checkout machine 5, and the checkout machine 5 may perform the checkout process; alternatively, the mobile terminal 3 may perform the checkout process by a credit payment or the like based on the purchase information. That is, in the above-described example embodiment, the cooperative purchase process carried out by the cart 4 and the checkout machine 5 may be performed by the mobile terminal 3.

(Modification 4)

In the above-described example embodiment, in a case where the customer is aware of that unnecessary items or duplicate items are registered in the cooperative cart by looking at the item selection screen, it is possible to send a notice by a message or deny even when the totaling request is received, by operating the cart 4. In addition, the cart 4 may apply a flag on an unnecessary item among the items registered in the cooperative cart in response to an operation of the customer, and in a case where there is the item with the flag when the payment is made, a return process may be performed without the payment for the item with the flag.

(Modification 5)

In the above example embodiment, the cart 4 performs the item registration, a payment is made for the registered items to be purchased by using the checkout machine 5. However, the present disclosure is not limited thereto, without using the checkout machine 5, the cart 4 may perform the payment. As the payment method by the cart 4, for instance, a credit payment by having the cart 4 scan a credit card, and various methods such as an electronic money payment by holding an IC (Integrated Circuit) card or a smartphone over the cart 4 can be applied. Moreover, the cart 4 performs the item registration, the registered items to be purchased may be paid using the mobile terminal 3. In this case, for instance, the display unit 41 of the cart 4 displays a QR code or the like indicating information related to the items to be purchased information and a payment amount, and the mobile terminal 3 acquires the information by scanning the QR code and pays by the credit payment and an electronic money payment.

(Modification 6)

In the above example embodiment, the cart 4 which collects pieces of the item acquisition information, sends the items to be purchase information concerning the items to be purchase to the checkout machine 5, the checkout machine 5 performs a checkout based on received items to be purchased information. However, the present disclosure is not limited thereto, and the cart 4, which has collected the item acquisition information, displays the code indicating information concerning the items to be purchased on the display unit 41, and the checkout machine 5 may perform the checkout process based on the code. Here, the code is, for instance, a QR code or a barcode. Moreover, in a case where the mobile terminal 3 collects the item acquisition information, the mobile terminal 3 displays the code indicating the information concerning the items to be purchased, the checkout machine 5 may perform the checkout process based on the code.

Alternatively, some or all of the example embodiments described above (including modifications, the same shall apply hereinafter) may be described as the following supplementary notes, but not limited to the following.

(Supplementary Note 1)

1. A terminal device capable of acquiring item identification information of each item to be purchased, the terminal device comprising:
    a cooperation ID acquisition unit configured to acquire a cooperation ID; and
    a sharing unit configured to share information concerning the terminal device and a cooperative terminal device that is a different terminal device from the terminal device and includes the same cooperation ID.

(Supplementary Note 2)

2. The terminal device according to supplementary note 1, wherein the terminal device is a mobile terminal used by a customer purchasing the item.

(Supplementary Note 3)

3. The terminal device according to supplementary note 1 or 2, wherein the terminal device is a cart used by a customer purchasing the item.

(Supplementary Note 4)

4. The terminal device according to any one of supplementary notes 1 through 3, wherein the terminal device is a shopping basket used by a customer purchasing the item.

(Supplementary Note 5)

5. The terminal device according to any one of supplementary notes 1 through 4, wherein the information concerning the terminal device and the cooperative terminal device is shared in real time by the sharing unit, and includes location information of the terminal device and the cooperative terminal device in a store.

(Supplementary Note 6)

6. The terminal device according to any one of supplementary notes 1 through 5, wherein the information concerning the terminal device and the cooperative terminal device is shared in real time by the sharing unit, and includes item acquisition information concerning pieces of the item identification information which are acquired by the terminal device and the cooperative terminal device.

(Supplementary Note 7)

7. The terminal device according to supplementary note 6, further comprising:
    an aggregation unit configured to collect pieces of the item acquisition information which are respectively acquired by the terminal device and the cooperative terminal device into one terminal device among the terminal device and the cooperative terminal device; and
    a payment calculation unit configured to calculate a payment for items based on the item information concerning prices of the items and the item acquisition information, wherein the aggregation unit aggregates and totals payments for the items respectively calculated by the terminal device and the cooperative terminal device.

(Supplementary Note 8)

8. The terminal device according to supplementary note 7, wherein the terminal device and the cooperative terminal device are unable to acquire the item identification information when the pieces of item acquisition information is collected into the one terminal device by the aggregation unit.

(Supplementary Note 9)

9. A purchase management method performed by a terminal device capable of acquiring item identification information of each item to be purchased, the purchase management method comprising:
    acquiring a cooperation ID; and
    sharing information concerning a terminal device and a cooperative terminal device that is a different terminal device from the terminal device and includes the same cooperation ID.

(Supplementary Note 10)

10. A program causing a computer to perform a process comprising:
    acquiring item identification information of each item to be purchased;
    acquiring a cooperation ID; and
    sharing information concerning a terminal device and a cooperative terminal device that is a different terminal device from the terminal device and includes the same cooperation ID.

While the present disclosure has been described with reference to the example embodiments, the present disclosure is not limited to the above example embodiments. Various changes that can be understood by those skilled in the art within the scope of the present disclosure can be made in the configuration and details of the present disclosure. In other words, it is needless to say that the present disclosure includes various modifications and modifications that could be made by a person skilled in the art according to the entire disclosure, including the scope of the claims, and the technical philosophy. In addition, each disclosure of the above-mentioned patent documents or the like cited shall be incorporated with reference to this document.

This application claims priority based on Japanese Patent Application 2020-058225, filed Mar. 27, 2020, and incorporates all of its disclosure herein.

DESCRIPTION OF SYMBOLS

1 POS server
2 Management server
3 Mobile terminal

4 Cart
5 Checkout machine
6 Product shelf
7 Product barcode
100 Purchase management system

What is claimed is:

1. A terminal device capable of acquiring item identification information of each item to be purchased from a plurality of shopping carts or baskets at least one of which having or being in communication with the terminal device, the terminal device comprising:
a memory storing instructions; and
one or more processors configured to execute the instructions to:
acquire a cooperation ID;
share information concerning the terminal device and a cooperative terminal device that is a different terminal device from the terminal device and includes the same cooperation ID, a second one of the plurality of shopping carts or baskets having or being in communication with the cooperative terminal device, and the same cooperating ID associates the at least one of the plurality of shopping carts or baskets with the second one of the plurality of shopping carts or baskets; and
generating, based on the information being shared, a total amount of first prices of first items to be purchased for the terminal device and second prices of second items to be purchased for the cooperative terminal device, in response to pressing of a total button for totaling the first prices for the terminal device and the second prices of the second items for the cooperative terminal device, the total amount representing combined prices of the first items, which are from the at least one of the plurality of shopping carts or baskets, and of the second items, which are from the second one of the plurality of shopping carts or baskets.

2. The terminal device according to claim 1, wherein the terminal device is a mobile terminal used by a customer purchasing the item.

3. The terminal device according to claim 1, wherein the terminal device is a cart used by a customer purchasing the item, the cart being the first one of the plurality of shopping carts or baskets.

4. The terminal device according to claim 1, wherein the terminal device is a shopping basket used by a customer purchasing the item, the shopping basket being the first one of the plurality of shopping carts or baskets.

5. The terminal device according to claim 1, wherein the information concerning the terminal device and the cooperative terminal device is shared in real time, and includes location information of the terminal device and the cooperative terminal device in a store.

6. The terminal device according to claim 1, wherein the information concerning the terminal device and the cooperative terminal device is shared in real time, and includes item acquisition information concerning pieces of the item identification information which are acquired by the terminal device and the cooperative terminal device.

7. The terminal device according to claim 6, wherein the processor further is configured to
collect pieces of the item acquisition information which are respectively acquired by the terminal device and the cooperative terminal device into one terminal device among the terminal device and the cooperative terminal device; and
calculate a payment for items based on the item information concerning prices of the items and the item acquisition information,
wherein the processor aggregates and totals payments for the items respectively calculated by the terminal device and the cooperative terminal device.

8. The terminal device according to claim 7, wherein the terminal device and the cooperative terminal device are unable to acquire the item identification information when the pieces of item acquisition information are collected into the one terminal device.

9. A purchase management method performed by a terminal device capable of acquiring item identification information of each item to be purchased from a plurality of shopping carts or baskets at least one of which having or being in communication with the terminal device, the purchase management method comprising:
acquiring a cooperation ID;
sharing information concerning a terminal device and a cooperative terminal device that is a different terminal device from the terminal device and includes the same cooperation ID, a second one of the plurality of shopping carts or baskets having or being in communication with the cooperative terminal device, and the same cooperating ID associates the at least one of the plurality of shopping carts or baskets with the second one of the plurality of shopping carts or baskets; and
generating, based on the information being shared, a total amount of first prices of first items to be purchased for the terminal device and second prices of second items to be purchased for the cooperative terminal device based on the information being shared, in response to pressing of a total button for totaling the first prices for the terminal device and the second prices of the second items for the cooperative terminal device, the total amount representing combined prices of the first items, which are from the at least one of the plurality of shopping carts or baskets, and of the second items, which are from the second one of the plurality of shopping carts or baskets.

10. A non-transitory computer-readable recording medium storing a program, the program causing a computer to perform a process comprising:
acquiring item identification information of each item to be purchased;
acquiring a cooperation ID;
sharing information concerning a terminal device and a cooperative terminal device that is a different terminal device from the terminal device and includes the same cooperation ID, a second one of the plurality of shopping carts or baskets having or being in communication with the cooperative terminal device, and the same cooperating ID associates the at least one of the plurality of shopping carts or baskets with the second one of the plurality of shopping carts or baskets; and
generating, based on the information being shared, a total amount of first prices of first items to be purchased for the terminal device and second prices of second items to be purchased for the cooperative terminal device based on the information being shared, in response to pressing of a total button for totaling the first prices for the terminal device and the second prices of the second items for the cooperative terminal device, the total amount representing combined prices of the first items, which are from the at least one of the plurality of shopping carts or baskets, and of the second items, which are from the second one of the plurality of shopping carts or baskets.

11. The terminal device according to claim 1, wherein the one or more processors are further configured to execute the instructions to:
    send a totaling request for totaling the first prices for the terminal device and the second prices of the second items for the cooperative terminal device, to the cooperative terminal device in response to pressing of the total button, and determining which of approval information and rejection information has been received from the cooperative terminal device after sending the totaling request;
    combine the first prices and the second prices to be purchased respectively for the terminal device and the cooperative terminal device; and
    display a screen indicating that the rejection information has been received, in response to receiving of the rejection information.

12. The terminal device according to claim 11, wherein the one or more processors are further configured to execute the instructions to:
    display a totaling approval screen for selecting one of approval and rejection with respect to the totaling request in response to receiving of the totaling request from the cooperative terminal device; and
    send one of the approval information and the rejection information, the one corresponding to the selection on the totaling approval screen.

13. The terminal device according to claim 1, wherein the one or more processors are further configured to execute the instructions to:
    identify at least one item, of the second items, as being placed into the second one of the plurality of shopping carts or baskets;
    communicate, to the first one of the plurality of shopping carts or baskets, that the at least one item, of the second items, is identified as placed into the second one of the plurality of shopping carts or baskets; and
    communicate, to the second one of the plurality of shopping carts or baskets and from the first one of the plurality of shopping carts or baskets, a request from the first one of the plurality of shopping carts or baskets, to remove the one item from the second one of the plurality of shopping carts; and
    communicate, to the first one of the plurality of shopping carts or baskets and from the second one of the plurality of shopping carts or baskets, whether the one item is removed from the second one of the plurality of shopping carts.

* * * * *